United States Patent [19]
Kammerer

[11] Patent Number: 5,600,625
[45] Date of Patent: Feb. 4, 1997

[54] TURNTABLE FOR DISC-SHAPED INFORMATION CARRIERS

[75] Inventor: Manfred Kammerer, St. Georgen, Germany

[73] Assignee: Deutsche Thomson-Brandt GmbH, Germany

[21] Appl. No.: 420,898

[22] Filed: Apr. 11, 1995

Related U.S. Application Data

[63] Continuation of Ser. No. 150,909, Nov. 12, 1993, abandoned.

[30] Foreign Application Priority Data

Nov. 19, 1992 [DE] Germany .......................... 42 38 941.0

[51] Int. Cl.⁶ ..................................................... G11B 3/60
[52] U.S. Cl. .............................................. 369/270; 369/264
[58] Field of Search ......................................... 369/263, 264, 369/266, 269, 270, 271

[56] References Cited

U.S. PATENT DOCUMENTS 4,841,516  6/1989  Ohmori et al. ........................ 369/264

FOREIGN PATENT DOCUMENTS

| 0261895 | 3/1988 | European Pat. Off. . | |
|---|---|---|---|
| 0372638 | 6/1990 | European Pat. Off. . | |
| 0215226 | 5/1972 | Germany | 369/270 |
| 3-130959 | 6/1991 | Japan | 369/264 |
| 2063548 | 6/1981 | United Kingdom | 369/264 |
| 2095019 | 9/1982 | United Kingdom | 369/266 |
| 2251116 | 6/1992 | United Kingdom . | |

OTHER PUBLICATIONS

Patent Abstract Of Japan 61-239457 (A) Appl. No. 60-80559 Oct. 24, 1986.

Patent Abstract Of Japan vol. 11 No. 208 (P-593) Jul. 7, 1987.

*Primary Examiner*—Stuart S. Levy
*Assistant Examiner*—William J. Klimowicz
*Attorney, Agent, or Firm*—Joseph S. Tripoli; Eric P. Herrmann; James B. Hayes

[57] ABSTRACT

A turntable for disc-shaped records includes a disc-centering hub for engaging a centering aperture in the disc-shaped record. A bushing is coaxial with the disc-centering hub and connects the turntable to a driving mechanism. A circular part connects the bushing to an annular outer bearing surface. The annular outer bearing surface has a step portion forming a shoulder normal to the bearing surface and imbedded in the edge of the circular part. The shoulder rises above the circular part to support the disc-shaped records above the circular part by the hub and the bearing surface.

8 Claims, 4 Drawing Sheets

TURNTABLE FOR DISC-SHAPED INFORMATION CARRIERS

This is a continuation of application Ser. No. 08/150,909, filed Nov. 12, 1993, now abandoned.

BACKGROUND OF THE INVENTION

The present invention relates to a turntable for disc-shaped information carriers and the process for its production, the turntable having a central centering piece, which engages through a centring bore of the information carrier, and an outer marginal surface of the turntable, such as for example in the case of a CD player, which forms a bearing surface for the information carrier.

Disc-shaped information carriers, which for recording and reproducing information are rotatingly scanned or written to on a turntable, are generally known. While disc-shaped information carriers in the form of the long-known analogue phonographic record are generally placed in full surface contact on a turntable and rotate at a relatively low speed of 33⅓ or 45 revolutions per minute, disc-shaped information carriers, such as for example the CD or MOD, for which the dense storage technique is used are placed or restrained in a central region bearing no information and rotate at a considerably higher speed in the range of, for example, 500 revolutions per minute. On account of the high speed and the small dimensions of the regions to be scanned and on account of the central restraint of the information carrier, only small deviations of the rotating information carrier from the intended scanning location in the radial direction and in the vertical position can be allowed, meaning that high accuracy requirements are imposed on the fixing and centring of the information carrier on the turntable and on the turntable itself.

Apart from the centring, the accuracy of which is influenced by the centring piece engaging through the centring bore of the information carrier, narrow production tolerances have to be maintained on account of the central restraint of the information carrier, in particular with regard to the runout in the vertical direction of the turntable, i.e. the vertical oscillation of the turntable during rotation since a vertical turntable runout of, for example only 0.05 mm, which represents a maximum permissible upper limit, already causes at the outer edge of a CD a vertical runout of 0.2 mm, which in many cases no longer ensures the scanning reliability required for the information carrier.

There is a known turntable for disc-shaped information carriers which has been used for many years in CD players and has a bearing bush of brass which is pressed onto the drive spindle of a motor and on which an internally offset, flat metal disc is riveted on or splined with the bearing bush and forms a bearing surface for the information carrier, cf. FIG. 3. On account of the tolerances of the riveting surface of the brass bush with respect to the bearing surface of the information carrier, often the maximum permissible vertical runout is not maintained and results in a high proportion of defective turntables and high numbers of rejects. In addition, the joining operation of riveting has an adverse effect on the precision of the turntable, and fastening of the brass bush on the motor spindle requires high pressing-on forces, which result in deformations which likewise contribute to the vertical runout and to centring deviations. In order to reduce the pressing-on force or the load-bearing surface, slots have already been provided in the brass bush, but have only achieved the effect of a further deterioration in the running properties of the turntable.

For centring the information carrier on the turntable, a centring cone which is displaceable in the direction of the spindle of the turntable and is formed by a third part is provided. Although the displaceability of the centring piece on the turntable spindle advantageously permits an adaptation to tolerances of the centring bores of the information carriers, it itself causes eccentricities or deviations of the position of the information carrier in the radical direction on account of the play of the centring piece with respect to the turntable spindle.

Although the moment of inertia or the flywheel moment is no longer attributed prominent importance on account of the electronic direct drive of the turntable, it should be mentioned that nevertheless a high moment of inertia or a great flywheel moment is desirable to improve the running properties. The metal parts essentially influencing the moment of inertia are distributed relatively uniformly over the overall turntable area, so that there is a substantially uniform mass distribution.

Furthermore, a turntable consisting of a single piece of plastic-bonded, permanently magnetic powder material for recording on disc-shaped information carriers is known, cf. German Utility Model 78 34 662 of 22.11.1978. For producing the plastic-bonded, permanently magnetic material, a complex technological process is required, which has an adverse effect on the costs of the turntable. The uncomplex connection of the turntable to the motor spindle by means of a press fit has the effect in the case of the proposed powder material of stress cracks, consequently leading to failure of the player. In addition, the production-dependent range of variation of one-piece turntables of plastic-bonded materials does not meet the imposed requirements for accuracy or dimensional stability. Tests with solid plastic versions have shown that, in spite of a plurality of gating points, the accuracy described above cannot be maintained over a lengthy period of time also on account of the flow properties of the plastics and production-dependent tolerances.

On account of the homogeneity of the material, the turntable has no features supporting the flywheel moment, which tend rather to be adversely affected due to the low weight of the one-piece turntable.

The centring piece has a steep cone, meaning that a relatively accurate prepositioning with respect to the turntable is required for centring the information carrier.

Also known in conjunction with a one-piece turntable is a centring piece which is additionally placed on the one-piece turntable and is formed by plastic springs, cf. Specification CDM 12.3 in N.V. Philips Industrial Activities, REV. 1.0 of 14 Sep. 1992, page 27, FIG. 10. Since the tolerances of the centring piece add to the tolerances which the bearing surfaces of the turntable already have with respect to the drive spindle of the motor for production reasons, and since plastic springs suffer from fatigue for only a short time, only a low centring accuracy can be achieved.

Also known is a turntable for disc-shaped information carriers which comprises a flat metal disc which is offset in the inner region and which has in the inner region a plastic body, by which the motor spindle is received, cf. Drive unit for compact disc player (KSM-210) in Sony Electronic Devices General Catalog '91, page 76. The outer, annular edge of the metal disc serves as a bearing surface for the information carrier and the plastic body is arranged in the inner portion of the metal disc at a distance from the inner edge of the surface intended as a bearing for the information carrier. The inner region of the metal disc has recesses, into which the plastic body engages to achieve an anti-twisting effect. As a sealing surface in the injection mould for fitting the plastic body into the metal disc, use is made of an offset inner surface of the metal disc at a distance from the bearing surface of the information carrier. By the use of a plastic body in the inner region of the turntable, lower pressing-on forces are required, in particular for mounting the turntable on the motor spindle. By replacing the brass bush mentioned at the beginning by a plastic body, it has not been possible however to achieve any significant improvements with regard to the vertical runout of the turntable, the centring accuracy or radial errors occurring and the moment of inertia. With an envisaged centring piece which is slidingly displaceable in the direction of the motor spindle on a surface of the plastic body, only a low centring accuracy can be achieved on account of the cumulative tolerances between motor spindle and plastic body and also between the plastic body and the centring piece and on account of the clearance existing between the plastic body and the centring piece.

The object of the invention is therefore to provide a turntable for disc-shaped information carriers which ensures by its very design and its production process a low vertical runout, a high centring accuracy and an advantageous moment of inertia in an uncomplex way.

This object is achieved according to the invention by the features specified in Claims 1 and 6 and by the advantageous designs specified in the subclaims.

SUMMARY OF THE INVENTION

In order to avoid the disadvantages occurring in the case of known turntables, proposed is a turntable for disc-shaped information carriers which comprises a perforated disc which forms a bearing surface for the information carrier and has in the inner region a shoulder bounding the inner edge of the bearing surface, there being inserted in the inner region of the perforated disc a moulded part which receives the rotary spindle of the turntable and embeds the perforated disc right up against the shoulder of the bearing surface of the information carrier. The moulded part is preferably injection-moulded as a plastic part in an injection mould into the perforated disc, the bearing surface of the perforated disc for the information carrier simultaneously being used as a reference surface in the injection mould, and the inner region of the perforated disc being embedded in the moulded part right up against the inner edge of the bearing surface for the information carrier. The moulded part at the same time receives the rotary spindle of the turntable, meaning that cumulative tolerances adversely affecting the accuracy of production with regard to vertical runout and centring are avoided by the design and the production process of the turntable. This is achieved in particular by the fact that the surface of the perforated disc intended later as a bearing surface for the information carrier is used in the injection mould as a reference surface. The shoulder between the offset surface and the bearing surface for the information carrier serves in an advantageous way as a sealing surface in the injection mould. For centring the information carrier on the turntable, use is preferably made of a centring piece, which forms a structural unit with the moulded part injection-moulded in the inner region of the perforated disc, or is made simultaneously with and is integrated in the moulded part. The centring piece integrated into the turntable is formed by a pot-shaped hub, which has a rounded-off shape over a large diametral range, in order to permit centring even in the event of inaccurate precentring of the information carrier. Since the centring piece is produced simultaneously with the moulded part, there occur neither cumulative tolerances nor clearances which could adversely affect the centring accuracy. It has been established that the deviations occurring due to different diameters of the information carriers, or the undersize of the centring piece, can be chosen to be smaller than the tolerances occurring in the case of centring pieces which are displaceable with respect to the spindle of the motor. A combination of the proposed turntable with a displaceable centring piece likewise already has the effect, however, of turntables with lower vertical runout.

With regard to the moment of inertia or the flywheel moment, it should be noted that the preferably metallic perforated disc has a comparatively greater thickness and, in particular due to the concentration of mass elements in the bearing region of the information carrier, a high flywheel moment and advantageous running properties are achieved.

The turntable and the said measures permit in an uncomplex way the production of turntables which, by the very design proposed and by the very production process proposed have a low vertical runout and a high centring accuracy, meaning that the proportion of defectively produced turntables is reduced and the scanning reliability of the information carriers, such as for example of the compact disc or CD, also referred to as a digital phonographic record, a databank CD-ROM, a CD video or photo CD, is increased.

BRIEF DESCRIPTION OF THE DRAWING

The invention is explained in more detail below with reference to two exemplary embodiments in drawings, in which.

DETAILED DESCRIPTION

Figure 1:
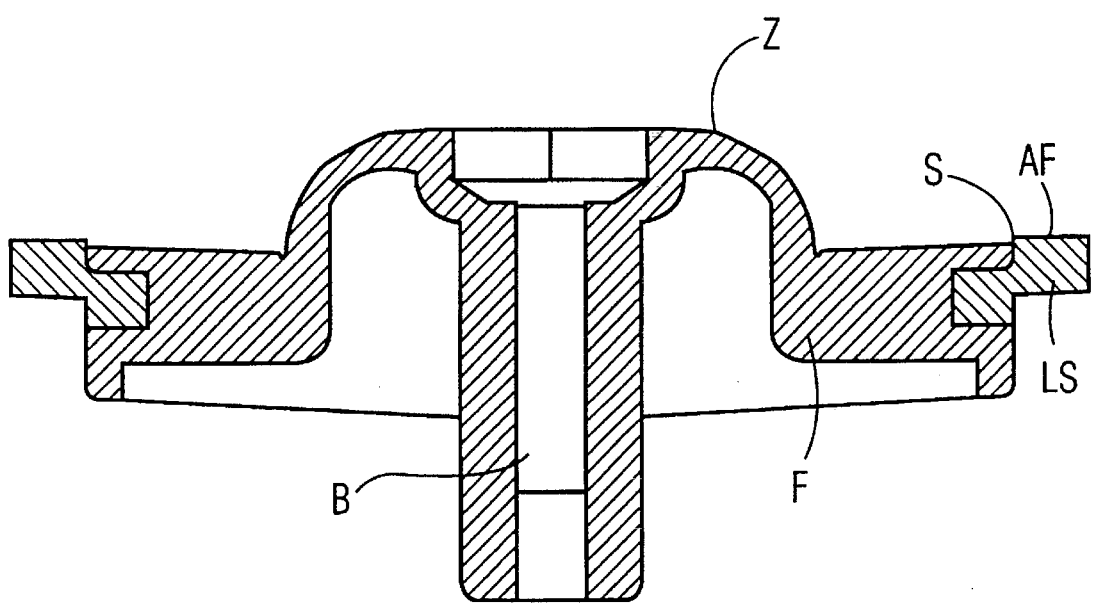
FIG. 1 shows a sectional representation of a first turntable according to the invention.
Figure 2:
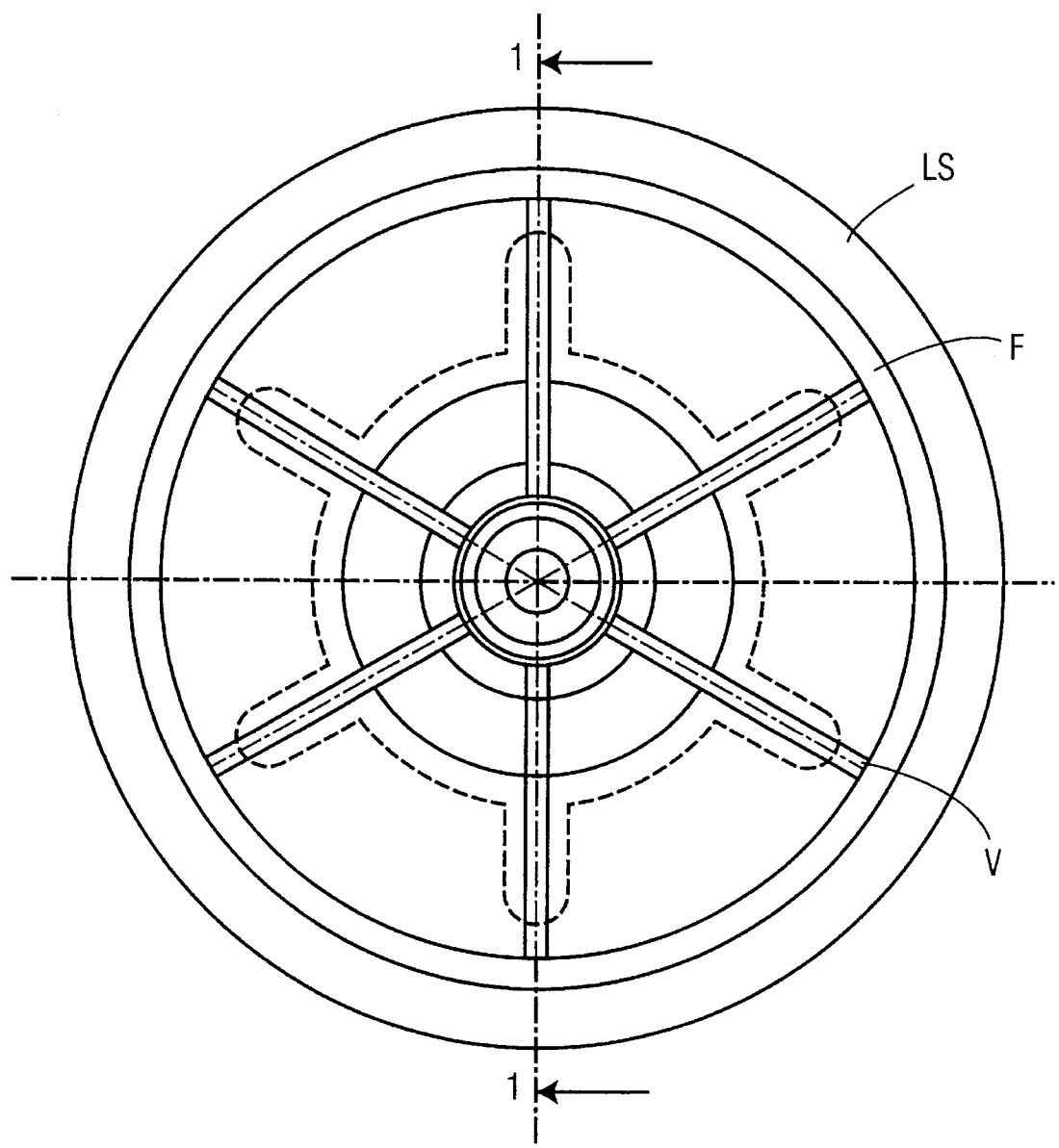
FIG. 2 shows a view of the turntable according to FIG. 1 from the underside.
Figure 3:
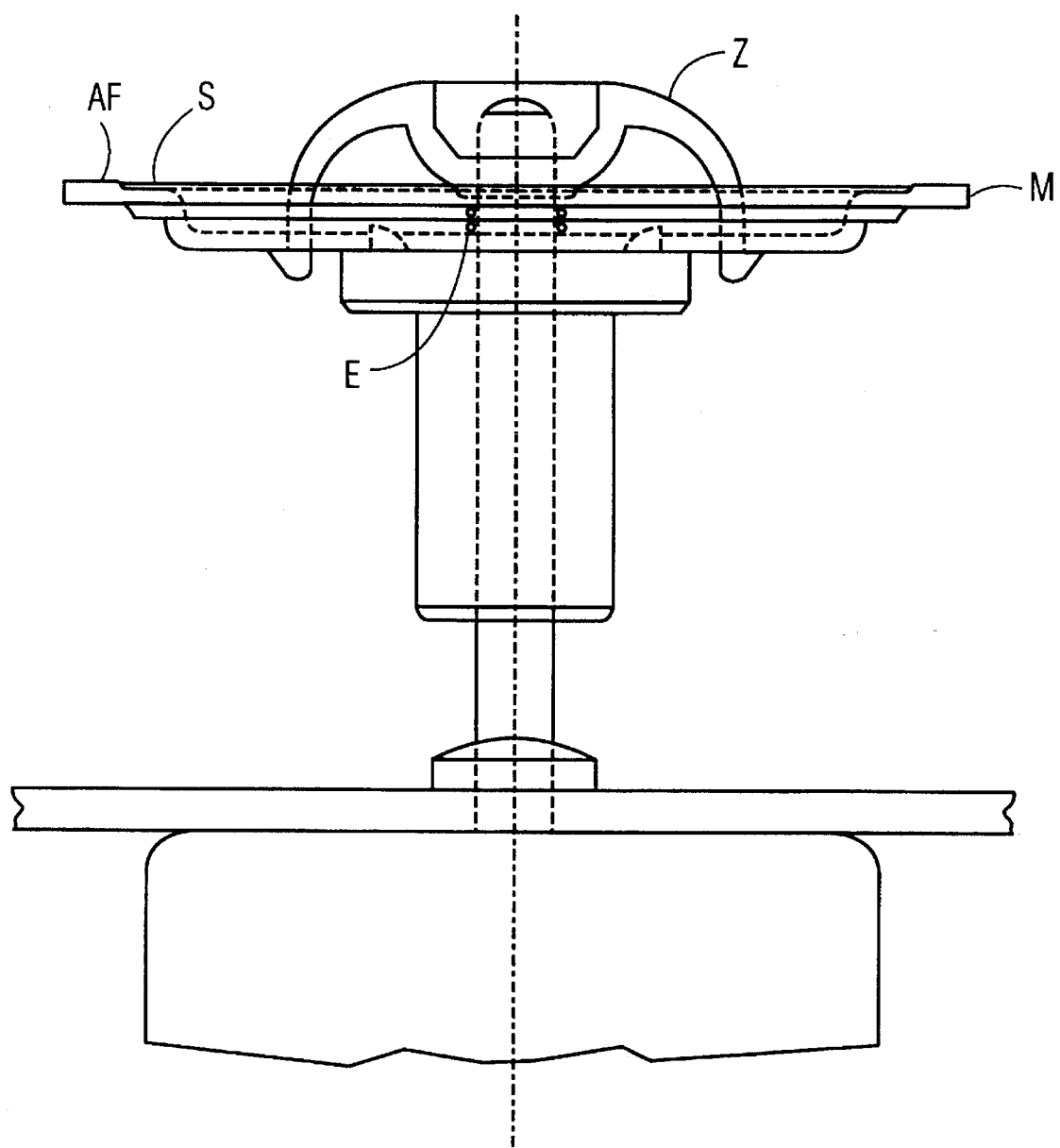
FIG. 3 shows the design of a known turntable and FIG. 4 shows a basic diagram of a second turntable according to the invention with a semilateral sectional view.
Figure 4:
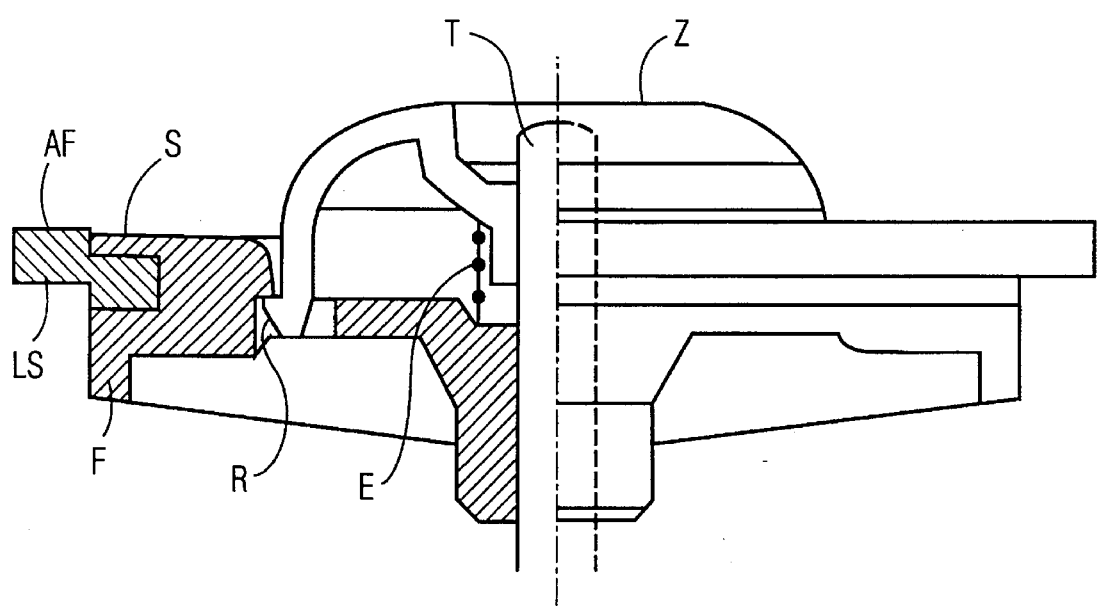

The turntable represented in FIG. 1 comprises a perforated disc LS, which has in the inner region a shoulder S and is embedded right up to the shoulder S in a moulded part F, which at the same time forms a centring piece Z and a bush B for receiving a drive spindle. The perforated disc LS, the surface of which not embedded in the moulded part forms the bearing surface AF for the information carrier, is produced as a stamped part from a metal ring, in order to permit in a known way the restraining of the information carrier by a puck (not shown), which serves as counterbearing, with magnetic means. The stamping achieves the effect of a high stability, dimensional stability and surface accuracy as far as the perforated disc LS and, in particular, the bearing surface AF for the information carrier are concerned. For this purpose, particular importance is attributed to the planishing of the bearing surface AF during the stamping, as also in the case of known turntables, and the perforated disc has a greater thickness in comparison with the metal disc M represented in FIG. 3 of a known turntable. The perforated disc LS of the turntable represented in FIGS. 1, 2 and 4 is embedded in the inner portion in a moulded part F, which is formed by a plastic body injection-moulded into the perforated disc LS by an injection mould, right up against the said shoulder S. The moulded part F is shaped in such a way that, corresponding to FIG. 1 and FIG. 4, it is offset with respect to the bearing surface AF for the information carrier in a region extending from the shoulder S to the centering piece Z, and is formed such that it slopes away further in the direction of the centring piece, in order to ensure exclusive placing or restraining of the information carrier on the bearing surface AF of the perforated disc LS. Nevertheless, the region of the perforated disc LS offset in the inner portion is embedded on both sides and completely in the moulded part F or plastic body right up to the shoulder S of the perforated disc LS. The inner, offset region of the perforated disc LS is completely enclosed in the moulded part F, or is completely enveloped by the moulded part F, whereby a form-fitting and force-fitting connection is established between the moulded part F and the perforated disc LS. The connection between moulded part F and perforated disc LS is additionally supported by webs or recesses provided in the inner portion of the perforated disc LS, which are represented in FIG. 2 as invisible body edges. Furthermore, to increase the stability and dimensional stability, there are, corresponding to FIG. 2, reinforcing ribs V provided on the underside of the moulded part F and they support a ring of the moulded part F arranged underneath the offset inner surface of the perforated disc LS, which ring at the same time forms an outer edge and an end point of the reinforcing ribs V directed towards the centre point of the turntable. In order to ensure reliable filling of the recesses formed between the driving webs in the inner region of the perforated disc LS when injection-moulding the moulded part F in the injection mould, the reinforcing ribs V are arranged in the region of the recesses.

This also created a precondition allowing the moulded part F to be shaped right up against the shoulder S of the bearing surface AF, in order to be able in an advantageous way to use the surface of the perforated disc LS intended as the bearing surface AF for the information carrier also as a reference surface in the injection mould when injection-moulding the moulded part F and nevertheless ensure an absolutely reliable anti-twisting effect between the moulded part F of plastic and the metallic perforated disc LS. By using the bearing surface AF of the perforated disc LS, intended as the bearing surface AF for the information carrier, as a reference surface in the injection mould when injection-moulding the moulded part F, cumulative tolerances are avoided between the bearing surface of the perforated disc LS and the bush B for receiving the drive spindle and with respect to the centring piece Z, likewise formed by the moulded part, and with respect to one another, meaning that such a turntable has by virtue of its special design and its production technology a low vertical runout and a high centring accuracy.

Due to the comparatively concentrated arrangement of weighty mass parts in the edge region, the turntable achieves a greater moment of inertia or flywheel moment, which has further advantageous effects on the running properties of the turntable.

The advantage of the reduced vertical runout can, according to a second embodiment corresponding to FIG. 4, also be used in conjunction with a centring piece Z which is displaceable with respect to the rotary spindle of the turntable and which permits an adaptation or centring even in the event of extremely great deviations between the, in principle uniform, diameters of the centring bores of the information carriers. Just as in the case of the embodiment corresponding to FIG. 1, the turntable comprises a perforated disc S which is offset in the inner portion and is embedded in the inner portion in a moulded part F, consisting of plastic, right up to the shoulder S, which is formed by the inner edge of the bearing surface AF of the perforated disc LS for the information carrier. The bearing surface AF of the perforated disc LS for the information carrier is likewise used in an advantageous way as a reference surface when injection-moulding the moulded part F in the injection mould, meaning that turntables with reduced vertical runout are produced. The centring piece Z is made such that it engages with detents R in recesses of the moulded part F and is displaceable, sliding directly on the drive spindle T, and is supported on the moulded part F by means of a spring E. Due to the direct guiding of the centring piece Z on the drive spindle T, cumulative tolerances are avoided and the centring accuracy is determined essentially only by the clearance between the drive spindle T and the moulded part F. The guidance of the centring piece Z on the drive spindle T may be chosen to be comparatively long, meaning that only a small clearance is set, thereby achieving a high centring accuracy. Since embodiments corresponding to FIG. 1 and FIG. 4 differ only with regard to the centring piece Z used in the inner portion of the turntable, the advantages mentioned with respect to the moment of inertia or flywheel moment also apply to this embodiment.

What is claimed is:

1. In a turntable for disc shaped records, having;

an annular centrally apertured outer member having a peripheral record bearing surface with a radial inward facing inner edge;

a circular inner member with a central portion for receiving turntable drive means and including means for centering a record;

said outer member having a shoulder at the inner edge of said record bearing surface leading to a protruding offset projection recessed below said record bearing surface, said offset projection extending radially inward of said radial inward facing inner edge toward the drive means receiving portion of said inner member;

the improvement comprising:

said inner member being a non-metallic mouldable material which at its outer periphery completely surrounds and engages the protruding offset projection of said outer member up to and against said shoulder at said record bearing surface; and, the record bearing surface of the outer member is a location reference surface, in a direction normal thereto, for the inner member so as to minimize vertical run out of said turntable.

2. The turntable set forth in claim 1, wherein;

said outer member is metal and said inner member is a plastic material.

3. The turntable set forth in claim 1, wherein;

said inner member has a record facing substantially planar surface disposed below the level of said record bearing surface which slopes further away from the level of said record bearing surface in the direction of the drive means receiving portion.

4. The turntable set forth in claim 1, wherein;

said outer member includes a plurality of recesses in the offset projection having the moulded inner member arranged in engaging manner therewith;

said inner member having a plurality of radial extending reinforcing ribs; and said ribs being aligned with said recesses.

5. The turntable according to claim 1, wherein;

the inner member is formed and joined to the outer member by injection moulding;

the record bearing surface of the outer member provides a dimensional reference surface for the moulded inner member; and the offset projection of the outer member is completely embedded in the mouldable material of the inner member up to said shoulder.

6. The turntable according to claim 5, wherein;

said outer member is stamped metal and said inner member is a plastic material.

7. The turntable set forth in claim 1, wherein;

the means for centering a record comprises a pot-shaped hub formed as an integral part of said inner member.

8. The turntable set forth in claim 1, wherein;

the means for centering a record comprises a separate hub piece secured to said inner member by detents.

* * * * *